UNITED STATES PATENT OFFICE.

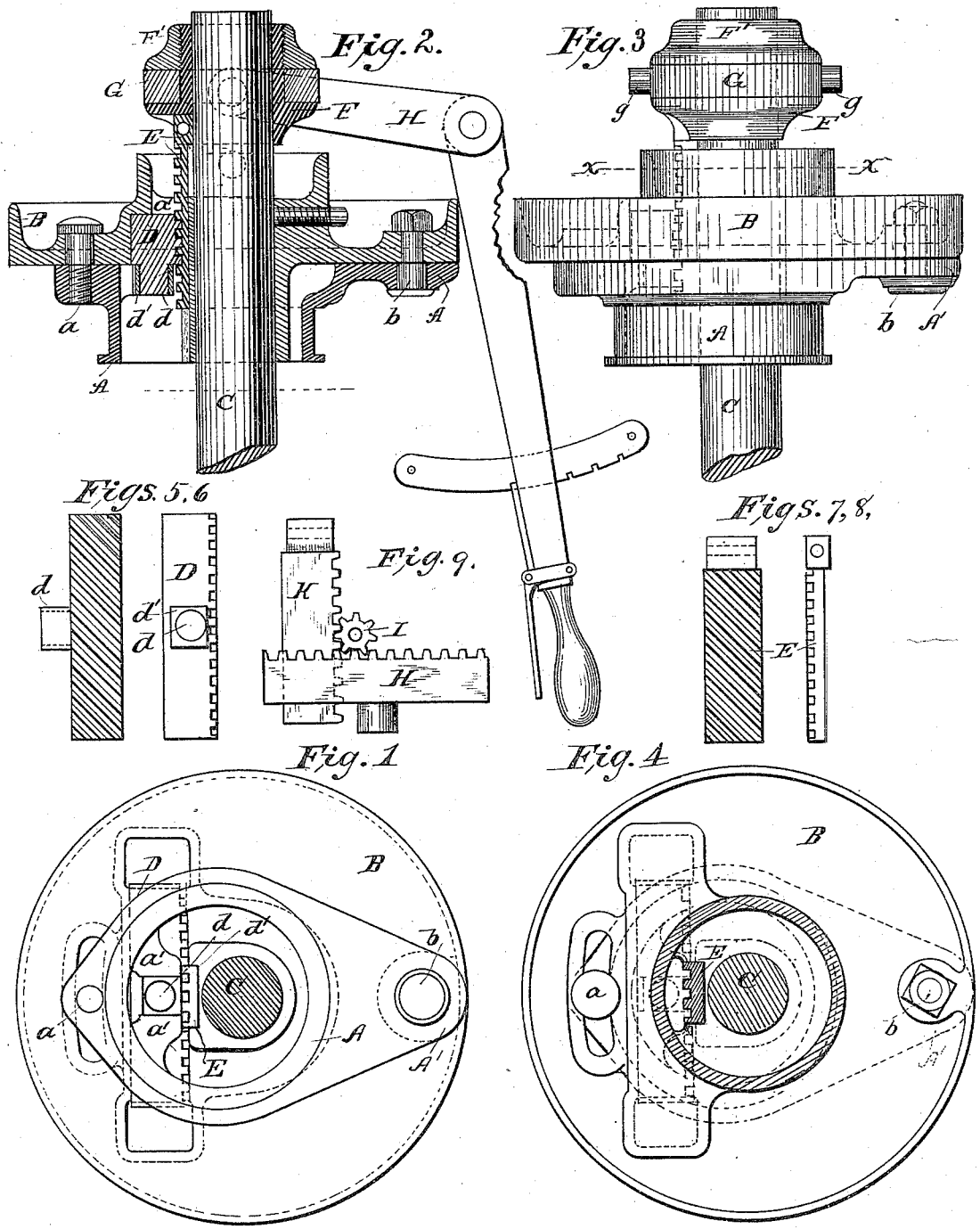

ABRAHAM O. FRICK, OF WAYNESBOROUGH, PENNSYLVANIA.

VARIABLE ECCENTRIC.

SPECIFICATION forming part of Letters Patent No. 299,215, dated May 27, 1884.

Application filed April 21, 1884. (No model.)

*To all whom it may concern:*

Be it known that I, ABRAHAM O. FRICK, a citizen of the United States, residing at Waynesborough, in the county of Franklin and State of Pennsylvania, have invented certain new and useful Improvements in Variable Eccentrics; and I do hereby declare the following to be a full, clear, and exact description of the invention, such as will enable others skilled in the art to which it appertains to make and use the same.

This invention relates to that class of shifting eccentrics in which the eccentric is pivoted to an arm or disk fixed to the crank-shaft, and is shifted across the shaft by an adjustable sliding collar thereon through intermediate devices.

My improvement consists, mainly, in the application of a cross-sliding rack for shifting the pivoted eccentric, said rack being mounted in a rectilinear cross-guideway on the fixed disk of the crank-shaft, and provided with oblique teeth, which are engaged by corresponding oblique teeth on a shifting-bar projecting from the sliding collar on the crank-shaft.

In order that my invention may be clearly understood, I have illustrated in the annexed drawings, and will proceed to describe, a practical form thereof.

Figure 1 is a front view of this improved shifting eccentric. Fig. 2 is an axial section thereof, showing also the shifter-lever and connections. Fig. 3 is a side view. Fig. 4 is a cross-section taken in the plane indicated by the broken line *x x* of Fig. 3. Figs. 5 and 6 illustrate the toothed rack. Figs. 7 and 8 illustrate the toothed shifting-bar.

The same letters of reference indicate identical parts in all the figures.

The eccentric, consisting, mainly, of a short flanged tube, A, for the support of the usual eccentric-strap, (not shown,) is provided with an arm, A', by which it is pivoted on stud *b*, secured to the disk B, fixed to crank-shaft C. The opposite end of the eccentric is also connected to the fixed disk B by a headed stud, *a*, which is fixed to the eccentric and plays in a slot in the disk. The eye of the eccentric, which is of such ample diameter that the eccentric may be shifted from one extreme position to the other without interfering with the hub of disk B, which projects into it in this instance, is provided with a couple of lugs, *a' a'*. These lugs form guides for the square box *d'* of a stud, *d*, on the cross-sliding rack D, which is fitted in a rectilinear guideway formed across the disk B. The side of the cross-sliding rack facing toward the crank-shaft is provided with oblique teeth, which are interlocked with the oblique teeth of the shifting-bar E, connected at one end with the sliding collar F. The toothed shifting-bar E is fitted in a longitudinal guideway formed in the hub of disk B. The sliding collar F carries a loose ring, G, which is confined on the collar by a nut, F', and is provided with pins *g g*. These pins are engaged by the forked arm of the shifter-lever H, by turning which the collar and toothed shifting-bar may be slid to move the cross-sliding rack for shifting the pivoted eccentric.

The cross-sliding rack and the means for operating it may be modified in various ways. For instance, in Fig. 9 I have illustrated a cross-sliding rack, H, constructed with straight teeth on its back, engaged by the teeth of a pinion, I, which is to be journaled on the fixed disk or arm of the crank-shaft, and is engaged in turn by the teeth on one edge of a shifting-bar, K.

I claim as my invention—

1. The combination, substantially as before set forth, of the fixed disk on the crank-shaft, the eccentric pivoted to said disk, and the cross-sliding rack for shifting the eccentric, said rack being mounted in a rectilinear cross-guideway of the fixed disk.

2. The combination, substantially as before set forth, of the fixed disk on the crank-shaft, the eccentric pivoted to said disk, the cross-sliding rack for shifting the eccentric, and the toothed shifting-bar fitted in a longitudinal guideway in the hub of the fixed disk.

In testimony whereof I affix my signature in presence of two witnesses.

ABRAHAM O. FRICK.

Witnesses:
E. T. WALKER,
W. M. HANNAY.